United States Patent
Anderson et al.

(10) Patent No.: US 9,158,074 B2
(45) Date of Patent: Oct. 13, 2015

(54) PIVOTING FIBER OPTIC CABLE CONNECTION DEVICE

(71) Applicant: ADC Telecommunications, Inc., Berwyn, PA (US)

(72) Inventors: David J. Anderson, Bloomington, MN (US); Christopher Stroth, Lakeville, MN (US)

(73) Assignee: ADC Telecommunications, Inc., Berwyn, PA (US)

(*) Notice: Subject to any disclaimer, the term of this patent is extended or adjusted under 35 U.S.C. 154(b) by 28 days.

(21) Appl. No.: 14/013,844

(22) Filed: Aug. 29, 2013

(65) Prior Publication Data

US 2014/0064664 A1 Mar. 6, 2014

Related U.S. Application Data

(60) Provisional application No. 61/695,845, filed on Aug. 31, 2012.

(51) Int. Cl.
| | |
|---|---|
| *G02B 6/36* | (2006.01) |
| *G02B 6/46* | (2006.01) |
| *G02B 6/38* | (2006.01) |
| *G02B 6/42* | (2006.01) |

(52) U.S. Cl.
CPC ............ *G02B 6/3604* (2013.01); *G02B 6/3825* (2013.01); *G02B 6/3897* (2013.01); *G02B 6/46* (2013.01); *G02B 6/3893* (2013.01); *G02B 2006/4297* (2013.01); *Y10T 29/49826* (2015.01)

(58) Field of Classification Search
CPC ... G02B 6/3604; G02B 6/3825; G02B 6/3897

USPC ............ 385/56, 58, 70; 439/13, 31, 165, 261, 439/284, 288, 294, 312, 341, 372, 467, 534, 439/838

See application file for complete search history.

(56) References Cited

U.S. PATENT DOCUMENTS

| | | | |
|---|---|---|---|
| 4,765,710 | A | 8/1988 | Burmeister et al. |
| 5,506,922 | A * | 4/1996 | Grois et al. ...................... 385/75 |
| 5,969,294 | A | 10/1999 | Eberle et al. |
| 6,154,597 | A * | 11/2000 | Roth ............................. 385/139 |
| 6,227,718 | B1 | 5/2001 | Harvey et al. |
| 6,227,885 | B1 | 5/2001 | Raviv et al. |
| 6,254,278 | B1 * | 7/2001 | Andrews et al. ................. 385/53 |
| 6,568,861 | B2 * | 5/2003 | Benner et al. ................... 385/55 |
| 6,709,168 | B2 | 3/2004 | Imabayashi et al. |
| 7,303,420 | B2 * | 12/2007 | Huch et al. .................... 439/341 |

(Continued)

FOREIGN PATENT DOCUMENTS

WO   WO 2009/040568   4/2009

*Primary Examiner* — Daniel Petkovsek
(74) *Attorney, Agent, or Firm* — Merchant & Gould P.C.

(57) ABSTRACT

A pivotable cable connection device for a pair of fiber optic connectors includes a carriage and a housing. The carriage includes a body defining a hub pin receiver and an actuator pin slot. A face is connected to the body and defines an opening. The housing is received within the carriage so as to extend through the opening. The housing includes a housing axis and a hub pin. The hub pin is received within the hub pin receiver. Additionally, the housing includes an actuator pin that is received within the actuator pin slot. The housing axis is substantially orthogonal to the face when the actuator pin is positioned in a first end of the actuator pin slot, and is positioned oblique to the face when the actuator pin is positioned in a second end of the actuator pin slot.

11 Claims, 8 Drawing Sheets

(56) References Cited

U.S. PATENT DOCUMENTS

| | | |
|---|---|---|
| 7,702,207 B2 | 4/2010 | Adomeit et al. |
| 7,722,258 B2 * | 5/2010 | Lu et al. .......................... 385/53 |
| 8,636,424 B2 * | 1/2014 | Kuffel et al. .................... 385/78 |
| 8,939,792 B2 | 1/2015 | Takeuchi et al. |

* cited by examiner

PIVOTING FIBER OPTIC CABLE CONNECTION DEVICE

CROSS-REFERENCE TO RELATED APPLICATIONS

This application claims the benefit of U.S. Provisional Application No. 61/695,845, filed Aug. 31, 2012, and titled "Pivoting Fiber Optic Cable Connection Device," the disclosure of which is hereby incorporated herein by reference.

BACKGROUND

Optical connection devices are configured to connect at least a first optical connector to at least a second optical connector. In particular, the connection device aligns ferrules of the first and second optical connectors. Each optical connector terminates an optical fiber that carries light signals. In certain applications, the light signals (e.g., light beams) carried by the optical fibers originate from lasers or other powerful light sources. Connectors on an active fiber optic system will emit a light beam when that connector is not in use. In some conventional systems, shutters or closures have been added to optical connection devices to close off empty ports when one or more optical connectors are removed from an optical adapter. These shutters or closures, however, can be broken or inadvertently damaged, or even deliberately stolen.

SUMMARY

In one aspect, the technology relates to a pivotable cable connection device for a pair of fiber optic connectors, the cable connection device including: a carriage including: a body defining a hub pin receiver and an actuator pin slot; and a face connected to the body, wherein the face defines an opening; a housing received within the carriage so as to extend through the opening, wherein the housing includes: a housing axis; a hub pin received within the hub pin receiver; and an actuator pin received within the actuator pin slot, wherein the housing axis is substantially orthogonal to the face when the actuator pin is positioned in a first end of the actuator pin slot, and wherein the housing axis is positioned oblique to the face when the actuator pin is positioned in a second end of the actuator pin slot.

In another aspect, the technology relates to a method of connecting a cable connector to a cable connection device including a carriage and a housing pivotably connected to the carriage, wherein the housing defines a housing axis and a port, the method including: inserting a cable connector into the port, when the housing is positioned in a first position wherein the housing axis is oblique to a face of the carriage; and pivoting the housing to a second position wherein the housing axis is substantially orthogonal to the face of the carriage once the cable connector is completely inserted into the port.

These and other features and advantages will be apparent from a reading of the following detailed description and a review of the associated drawings. It is to be understood that both the forgoing general description and the following detailed description are explanatory only and are not restrictive of the broad aspects of the disclosure.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
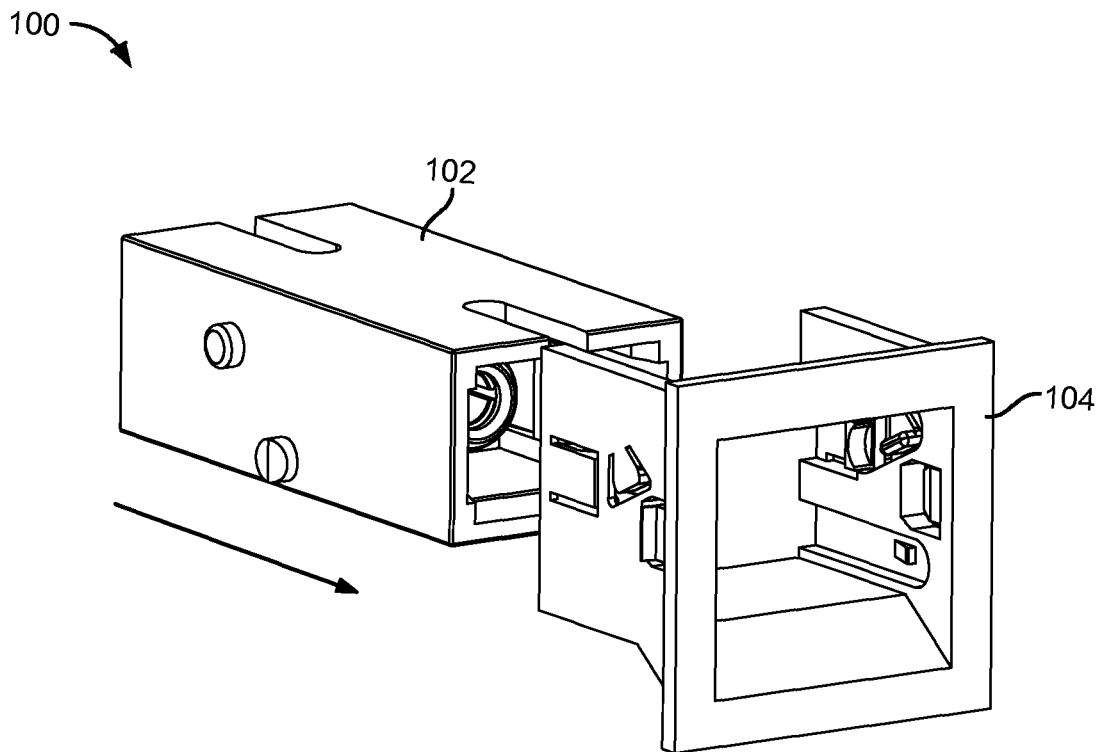
FIG. 1 is a front exploded perspective view of a pivotable cable connection device.

FIG. 1 is a front exploded perspective view of a pivotable cable connection device 100, which may be an optical adapter. The device 100 includes a housing 102 that is received within a carriage 104, and is further described in conjunction with FIGS. 2-4. The disclosed cable connection device 100 directs light at an angle out from an empty port towards a panel, wall, floor, or ceiling of a cabinet, frame, or other enclosure at which the connection device is located. The device 100 is configured to move from an initial orientation to a tilted orientation when an optical connector is removed from the device 100. In some implementations, the optical device 100 is oriented at a downward angle when in the tilted orientation, but may also be oriented to the side, depending on installation.

Figure 2:
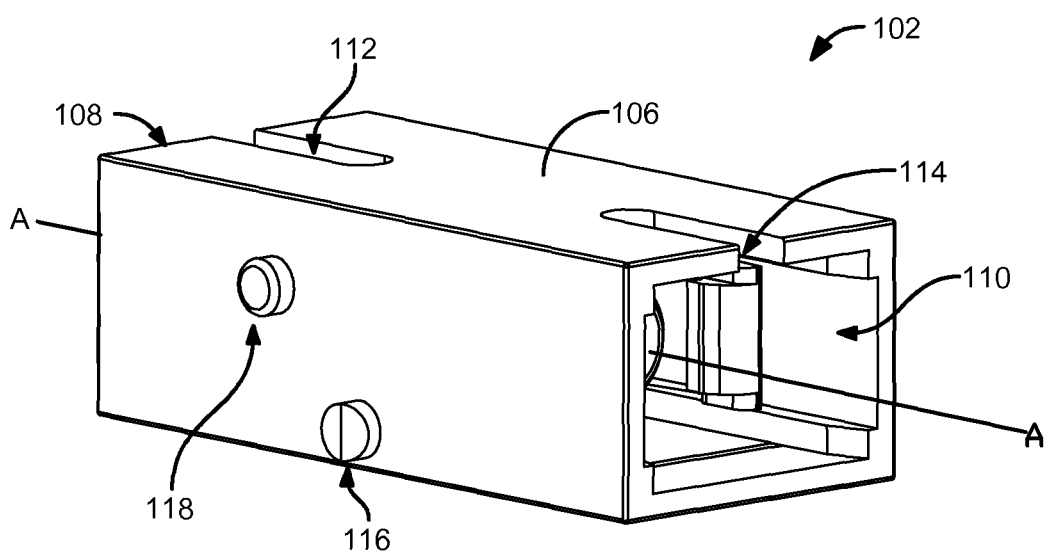
FIG. 2 is a front perspective view of a housing for the pivotable cable connection device of FIG. 1.

Turning to FIG. 2, the housing 102 includes a housing body 106 that defines a housing axis A. Each end of the housing body 106 defines a connector port 108, 110 for receiving a fiber optic connector (described below), which are both aligned along the housing axis A. Connector slots 112, 114 are also defined by the body 106 proximate the connector ports 108, 110 and are configured to receive projections on each of the fiber optic connectors. Hub pins 116 project from either side of the housing body 106, as do actuator pins 118.

Figure 3:
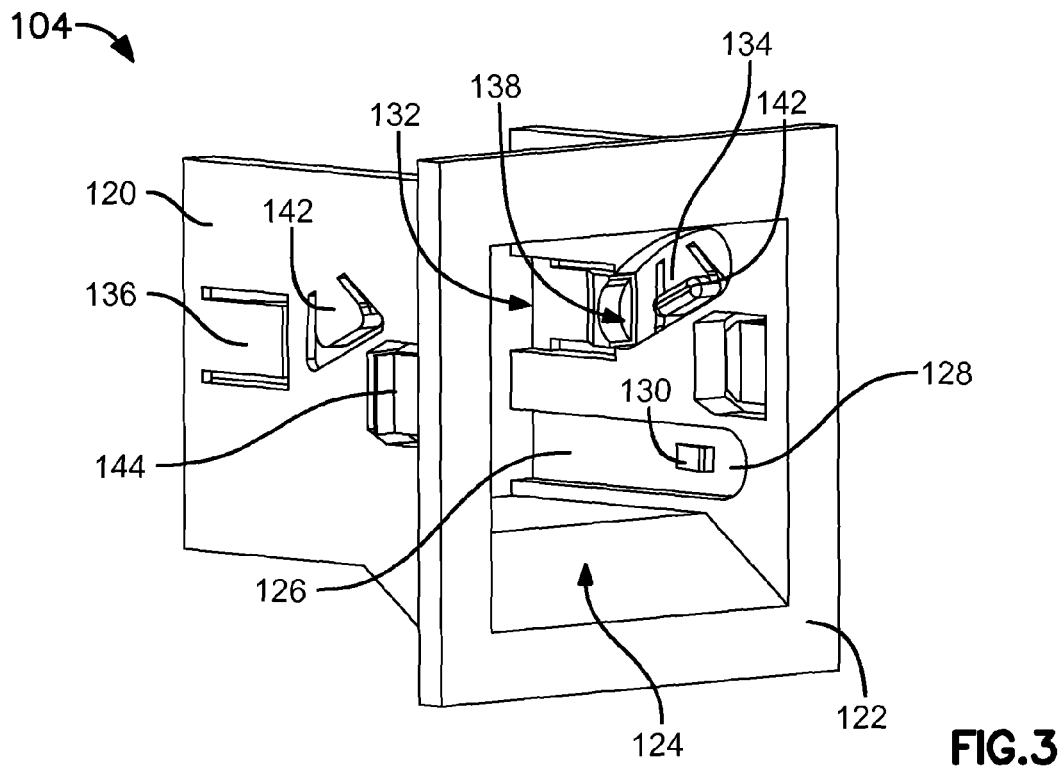
FIG. 3 is a front perspective view of a carriage for the pivotable cable connection device of FIG. 1.
Figure 4:
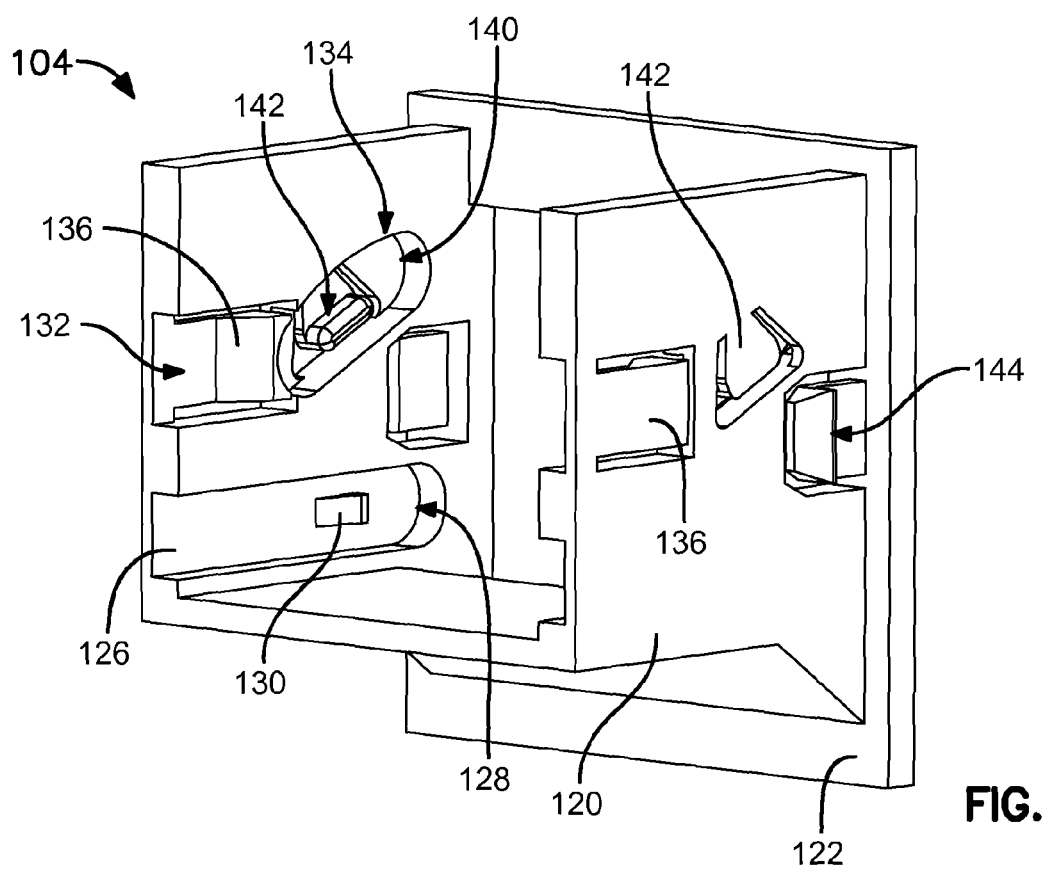
FIG. 4 is a rear perspective view of the carriage of FIG. 3.

FIGS. 3 and 4 depict perspective views of the carriage 104, which includes a body 120 and a face 122 connected thereto. The face 122 defines an opening 124 through which the housing 102 protrudes when the housing 102 is received in the carriage 104. Each inner side of the body 120 defines a hub pin slot 126 that is connected to a hub pin receiver 128. During insertion of the housing 102 into the carriage 104, the hub pin 116 is slidably received within the hub pin slot 126. As the hub pin 116 is slid towards the hub pin receiver 128, it contacts a projection 130 that projects from a surface of the hub pin slot 126 and defines a boundary between the hub pin slot 126 and the hub pin receiver 128. The projection 130 is configured to allow passage of the hub pin 116 into the hub pin receiver 128 and restrain the hub pin 116 therein.

Each inner side of the body 120 also defines an entry slot 132 that is connected to an actuator pin slot 134. During insertion of the housing 102 into the carriage 104, the actuator pin 118 is slidably received within the entry slot 132. As the actuator pin 118 is slid towards the actuator pin slot 134, it contacts a tab 136 that projects from the body 120 and defines a boundary between the entry slot 132 and the actuator pin slot 134. The tab 136 is configured to deflect outward so as to allow passage of the actuator pin 118 into the actuator pin slot 134. The tab 136 also restrains the actuator pin 118 in the actuator pin slot 134. Once in the actuator pin slot 134, the actuator pin 118 may be positioned in two different positions. When the actuator pin 118 is located at a first end 138 of the actuator slot 134, the housing 102 will be oriented such that the housing axis A is positioned substantially orthogonal to the face 122 of the carriage 104. When the actuator pin 118 is located at a second end 140 of the actuator slot 134, the housing 102 will be oriented such that the housing axis A is positioned at an angle oblique to the face 122 of the carriage 104. In certain embodiments, a spring may also bias the actuator pin 118 into the second end 140 of the actuator slot 134. A detent 142 projects from the body 120 and defines a boundary between the first end 138 and the second end 140 of the actuator slot 134. The detent 142 is configured to deflect outward so as to allow passage of the actuator pin 118 during movement of the actuator pin 118 from the first end 138 to the second end 140, as described below. As the actuator pin 118 is moved from the first end 138 to the second end 140, the detent 142 is forced out of the path of travel of the actuator pin 118. As the actuator pin 118 passes the detent 142, however, the detent 142 deflects back into the path of travel of the actuator pin 118, thus holding the actuator pin 118 in place at one end of the actuator slot 134. Additionally, the body 120 defines one or more panel latches 144 that are used to connect the carriage 104 to an equipment cabinet, frame, or enclosure.

FIGS. 5-8 depict a process of connecting a cable to the pivotable cable connection device 100. In FIGS. 5-8, the cable connection device 100 is oriented as it may be installed in a cabinet, frame, or other enclosure. In this position, the outer empty port 110 is angled downward, but may be angled in other orientations oblique to the face 122. A cable 200 is located within the cabinet, frame, or other enclosure, and terminates at a cable connector 202 that includes a projection 204. When the connector 202 is inserted into the inner port 108, the projection 204 is received within the connector slot 112. The actuator pin 118 is located in the second end 140 of the actuator pin slot 134 (not visible in FIG. 5). When in this position, the housing 102 is oriented such that the housing axis A is directed at an angle oblique to the face 122 of the carriage 104.

Figure 6:
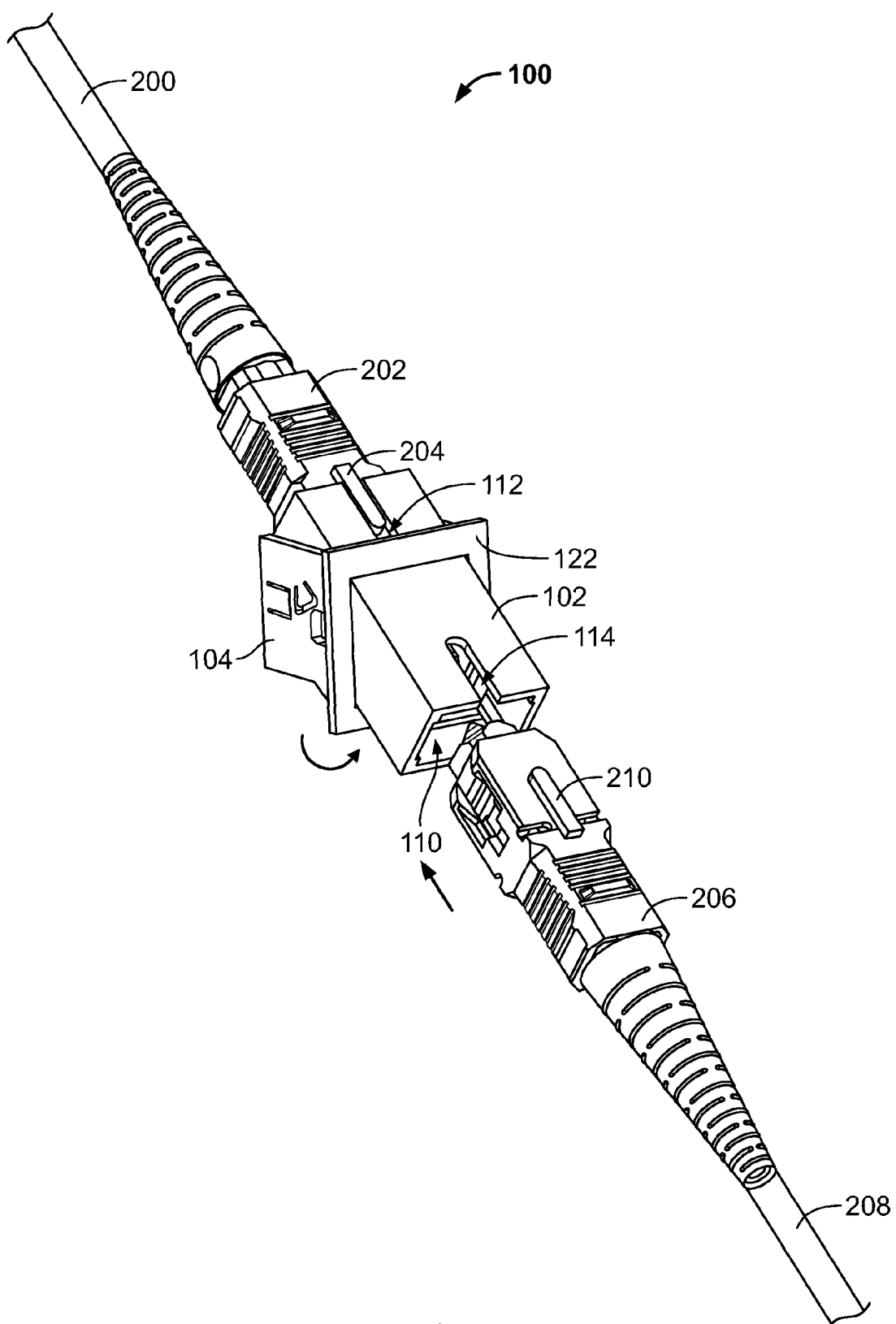
Figure 7:
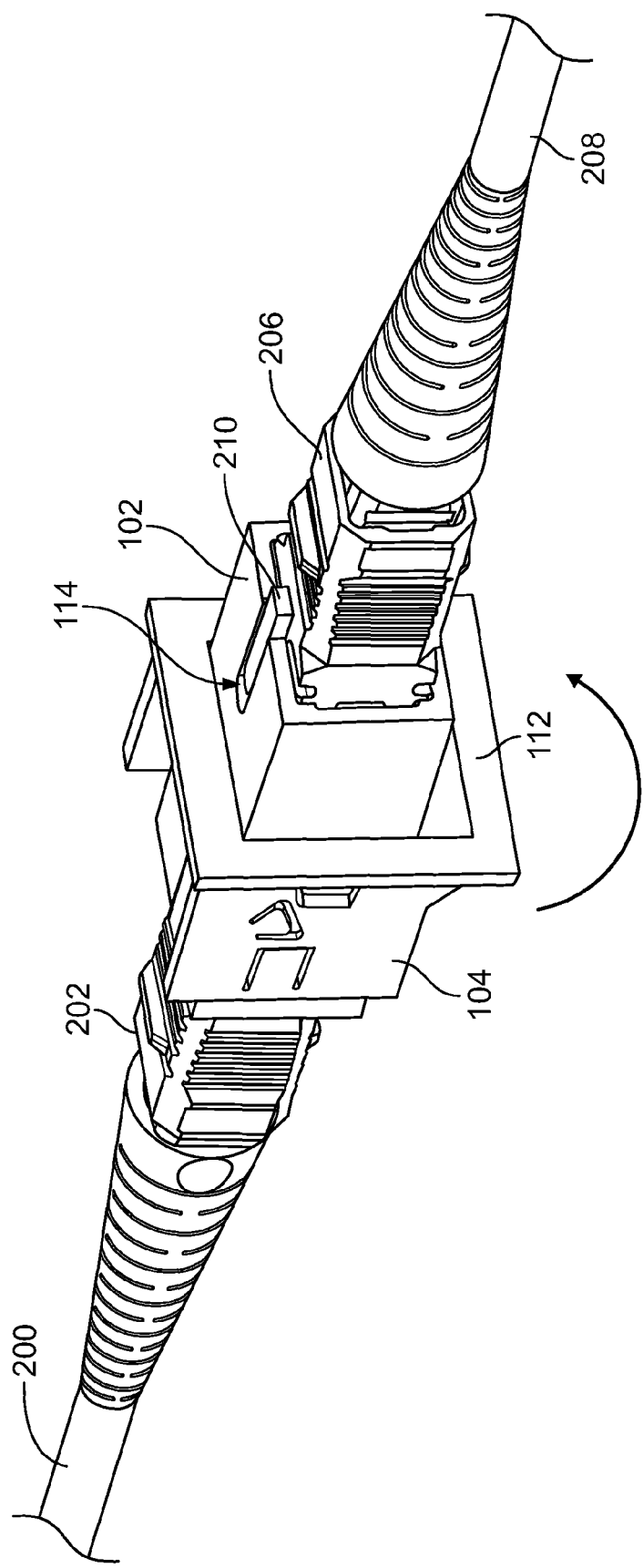
Figure 8:
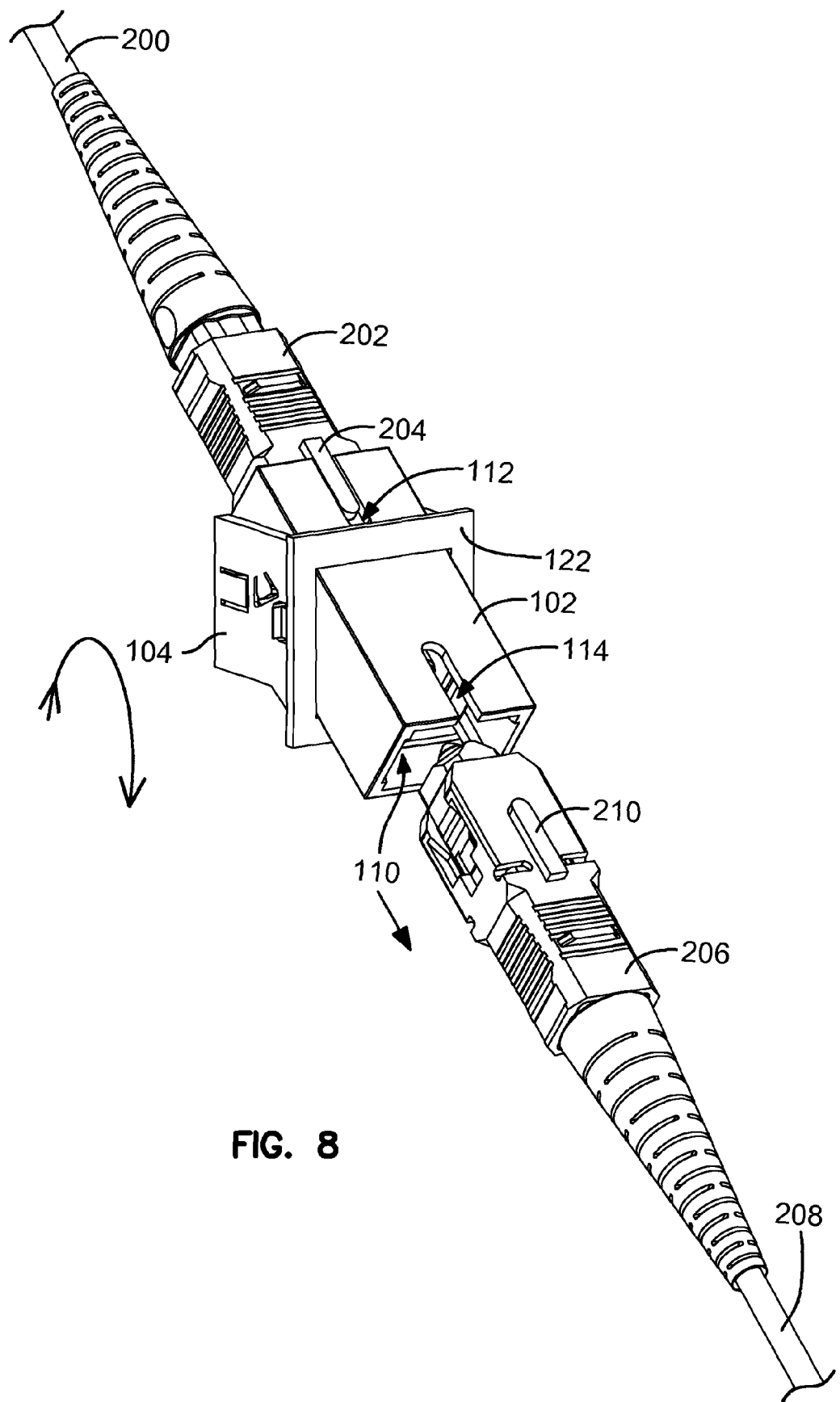

FIG. 6 depicts the connection device 100 as a second cable connector 206 terminating a second cable 208 is inserted into the outer port 110. The connector 206 includes a projection 210 that mates with the connector slot 114 at the outer port 110. As the connector 206 is inserted into the outer port 110, this compels pivoting of the housing 102 within the carriage 104. As the housing 102 pivots, the actuator pin 118 moves from the second end 140 of the actuator slot 134, past the detent 142, and into the first end 138 of the actuator slot 134 (not visible in FIG. 6). Insertion of the second cable connector 206 is completed when the housing 102 moves to the position depicted in FIG. 7. There, the actuator pin 118 is positioned in the first end 138 of the actuator pin slot 134, orienting the housing 102 such that the housing axis A (as defined here by the aligned connectors 202, 206) is substantially orthogonal to the face 122. Removal of the second connector 206 and the resulting pivoting movement of the housing 102 is depicted in FIG. 8. As the second cable connector 206 is withdrawn from the outer port 110, the actuator pin 118 is pulled from the first end 138 of the actuator slot 134, past the detent 142. Ultimately, the actuator pin 118 moves into the second end 140 of the actuator slot 134 and the housing 102 returns to the position where the housing axis A is oblique to the face 122.

Figure 9A:
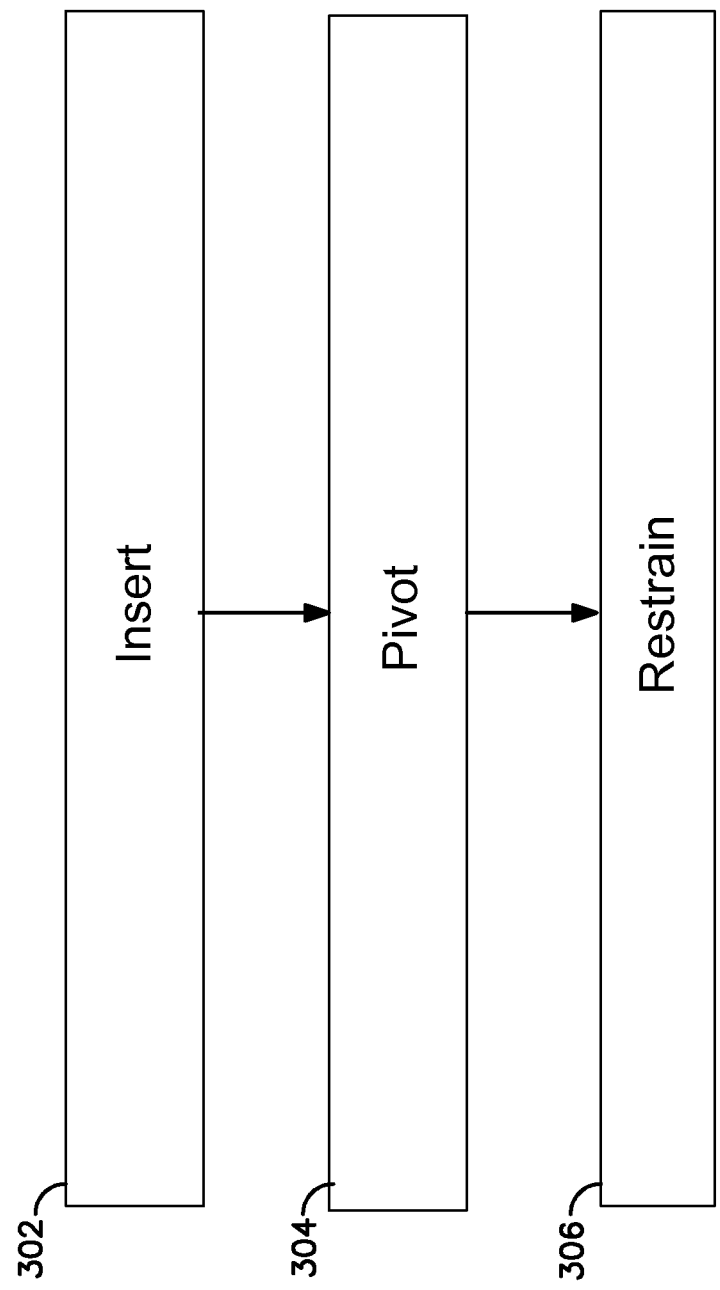
FIG. 9A depicts a method of connecting a cable connector to a pivotable cable connection device.

FIG. 9A depicts a method of inserting a cable connector into a pivoting cable connection device 300, such as the device depicted herein. The method begins with operation 302, where a housing in a pivotable device is in a first position and where a housing axis is oblique to a face of a carriage. In operation 302, a cable connector is inserted into a post of the housing. As the connector is inserted, the force of the insertion pivots the housing toward a second housing position, where the housing axis is substantially orthogonal to the carriage face, as depicted in operation 304. The insertion operation 302 and pivoting operation 304 occur substantially simultaneously and automatically, due to the configuration of the pivoting cable connection device. Once in the second position, insertion of the cable connector is complete and the housing is restrained in the second housing position, in operation 306. With regard to certain of the embodiments described herein, this is due to the position of the detent 142 within the actuator slot 134.

Figure 9B:
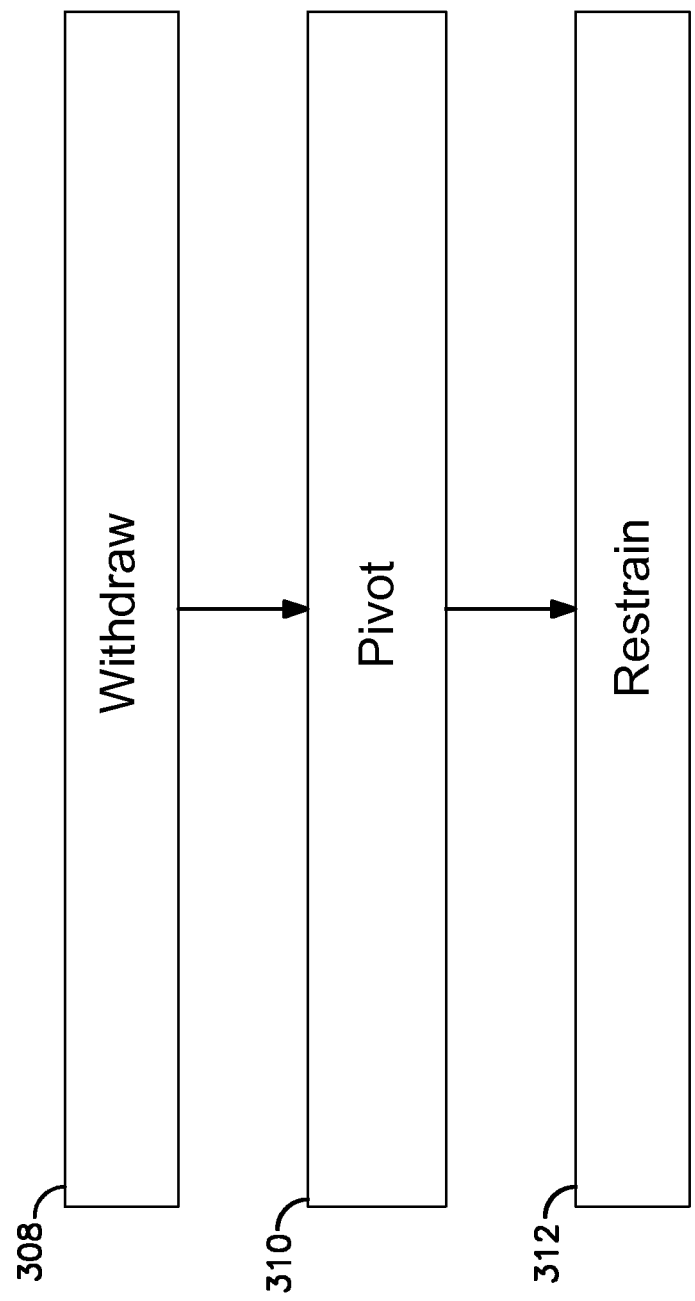
FIG. 9B depicts a method of disconnecting a cable connector to a pivotable cable connection device.

As shown in FIG. 9B, to remove the connector from the connection device, as depicted in operation 308, the cable connector is withdrawn. Substantially simultaneously with withdrawing of the connector, operation 310, pivoting of the housing toward the first position is performed automatically until the connector is completely withdrawn 310. Again, due to the position of the detent 142, the housing is restrained in this first position in operation 312. The housing may remain in the first position until a cable connector is re-inserted into the port.

Figure 5:
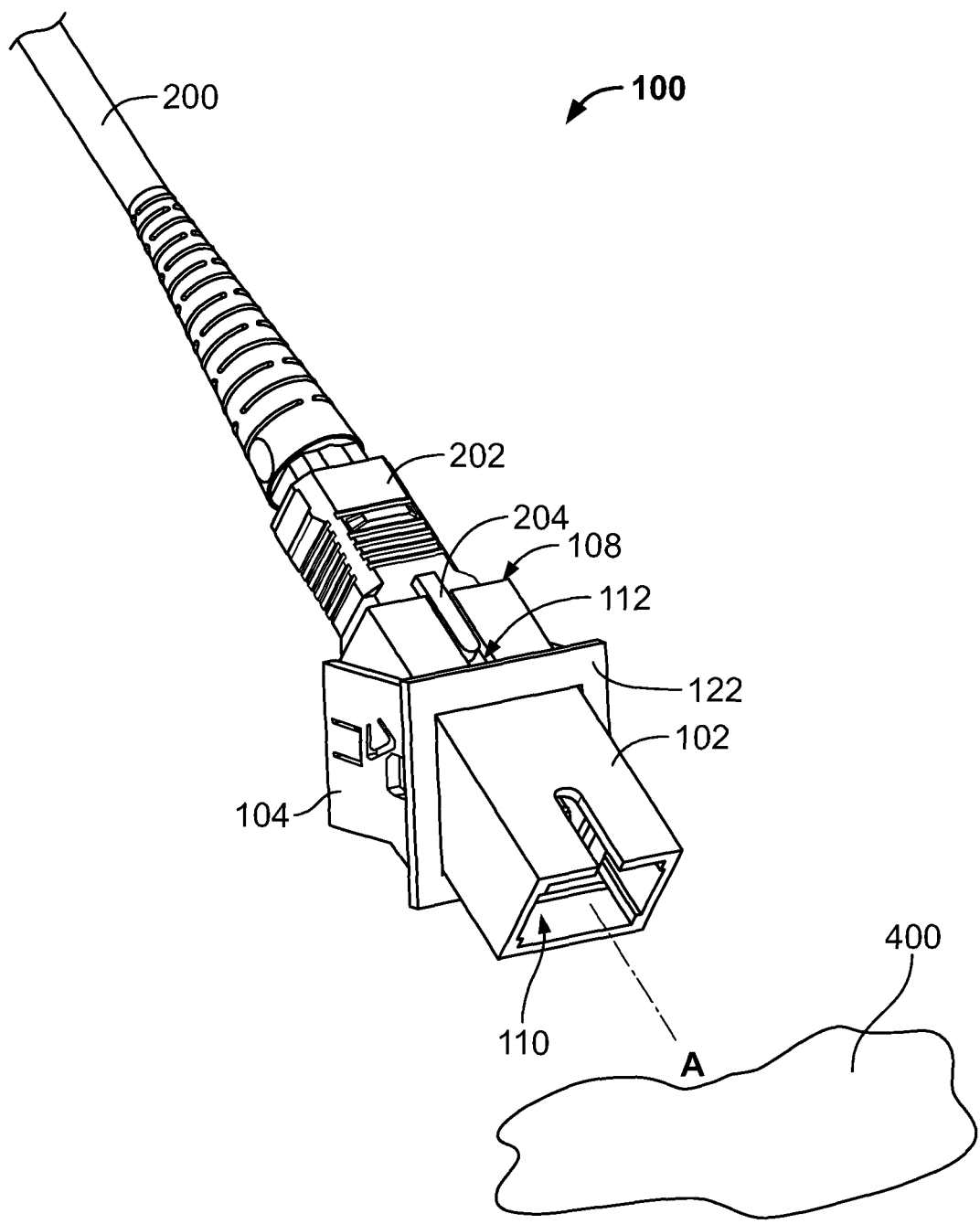
FIGS. 5-8 depict a method of connecting and disconnecting a cable from the pivotable cable connection device of FIG. 1.

As shown in FIG. 5, empty port 110 is angled downward toward surface 400. Surface 400 can be made from a light scattering material to prevent reflection toward a technician. Surface 400 can be angled so as to prevent reflection toward a technician.

Although the devices described herein are typically installed within panels, frames, or other enclosures, surface-mounted installations may also be utilized. The materials used for the components described herein may be the same as those typically used for electrical devices, such as molded plastics.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

We claim:

1. A pivotable cable connection device for a pair of fiber optic connectors, the cable connection device comprising:
   a carriage including:
      a body defining a hub pin receiver and an actuator pin slot; and
      a face connected to the body, wherein the face defines an opening;
   a housing received within the carriage so as to extend through the opening, wherein the housing including:
      a housing axis;
      a hub pin received within the hub pin receiver; and
      an actuator pin received within the actuator pin slot to pivot about the hub pin and along the actuator pin slot, wherein the housing axis is substantially orthogonal to the face when the actuator pin is positioned in a first end of the actuator pin slot, and wherein the housing axis is positioned oblique to the face when the actuator pin is positioned in a second end of the actuator pin slot.

2. The pivotable cable connection device of claim 1, wherein the body further defines a hub pin slot adapted to slidably receive the hub pin, wherein the hub pin slot is connected to the hub pin receiver.

3. The pivotable cable connection device of claim 2, further comprising a projection for restraining the hub pin in the hub pin receiver.

4. The pivotable cable connection device of claim 1, wherein the body further defines an entry slot adapted to slidably receive the actuator pin, wherein the entry slot is connected to the actuator pin slot.

5. The pivotable cable connection device of claim 1, wherein the body further comprises a detent projecting from a surface of the actuator pin slot between the first end of the actuator pin slot and the second end of the actuator pin slot.

6. The pivotable cable connection device of claim 5, wherein the detent is bistable so as to bias the actuator pin into each of the first end of the actuator pin slot and the second end of the actuator pin slot.

7. The pivotable cable connection device of claim 1, wherein the housing defines a first connector receiver and a second connector receiver, wherein each of the first connector receiver and the second connector receiver are aligned along the housing axis.

8. The pivotable cable connection device of claim 7, wherein the body defines a connector slot proximate each of the first connector receiver and the second connector receiver, wherein the connector slot is adapted to receive a projection on a fiber optic cable connector.

9. The pivotable cable connection device of claim 1, wherein the housing comprises a fiber optic adapter.

10. The pivotable cable connection device of claim 1, wherein the body further comprises a panel latch adapted to connect the device to an equipment panel.

11. The pivotable cable connection device of claim 1, further comprising a spring for biasing the actuator pin into at least one of the first end of the actuator pin slot and the second end of the actuator pin slot.

\* \* \* \* \*